(12) United States Patent
Song et al.

(10) Patent No.: US 10,447,789 B2
(45) Date of Patent: Oct. 15, 2019

(54) DISTRIBUTED FLOW CONTROL

(71) Applicant: Tencent Technology (Shenzhen) Company Limited, Shenzhen, Guangdong (CN)

(72) Inventors: Yinbo Song, Shenzhen (CN); Rui Guo, Shenzhen (CN); Maoshi Mai, Shenzhen (CN); Zhiqiang Niu, Shenzhen (CN); Jinsong Zhang, Shenzhen (CN); Wei Cheng, Shenzhen (CN); Haoran Liu, Shenzhen (CN); Qiang Jiang, Shenzhen (CN); Bo Ren, Shenzhen (CN); Baojun Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 386 days.

(21) Appl. No.: 15/169,897

(22) Filed: Jun. 1, 2016

(65) Prior Publication Data

US 2016/0316029 A1     Oct. 27, 2016

Related U.S. Application Data

(63) Continuation of application No. PCT/CN2014/095765, filed on Dec. 31, 2014.

(30) Foreign Application Priority Data

Dec. 31, 2013   (CN) .......................... 2013 1 0754752

(51) Int. Cl.
*H04L 29/08*         (2006.01)
*H04L 12/40*         (2006.01)
(Continued)

(52) U.S. Cl.
CPC ........ *H04L 67/16* (2013.01); *H04L 12/40032* (2013.01); *H04L 41/0893* (2013.01);
(Continued)

(58) Field of Classification Search
CPC ........... H04L 12/40032; H04L 41/0893; H04L 41/0896; H04L 47/10; H04L 67/42; H04L 67/16; H04W 28/02
(Continued)

(56) References Cited

U.S. PATENT DOCUMENTS 7,543,052 B1 *   6/2009   Cesa Klein ........... H04L 43/026
                                                          709/223
7,822,837 B1 *  10/2010   Urban ................. H04L 41/5009
                                                          709/223
(Continued)

FOREIGN PATENT DOCUMENTS

CN         101741850        6/2010
CN         101938401        1/2011
(Continued)

OTHER PUBLICATIONS

Office Action dated Feb. 14, 2018 for Chinese Application No. 201310754752.2, 7 pages.
(Continued)

*Primary Examiner* — Vivek Srivastava
*Assistant Examiner* — Binod J Kunwar
(74) *Attorney, Agent, or Firm* — Brinks Gilson & Lione

(57) ABSTRACT

A management server may provide distribute flow control to a computer server system for providing online services to users. The computer server system includes a bus cluster, a plurality of caller systems, and a plurality of callee clusters. The management server may be configured to receive from the bus cluster health condition data of a callee cluster of the plurality of callee cluster in a first operation cycle; determine
(Continued)

whether the callee cluster is slow or abnormal based on the health condition data in the first cycle; adjust a data flow limit in the bus cluster in a second cycle after the first cycle according to whether the callee cluster is slow or abnormal in the first cycle; and direct the bus cluster to control the data flow of the computer servers in the bus cluster in the second cycle according to the adjusted data flow limit.

14 Claims, 10 Drawing Sheets

(51) Int. Cl.
    *H04L 12/801*     (2013.01)
    *H04L 29/06*     (2006.01)
    *H04L 12/24*     (2006.01)

(52) U.S. Cl.
    CPC .......... *H04L 41/0896* (2013.01); *H04L 47/10* (2013.01); *H04L 67/42* (2013.01)

(58) Field of Classification Search
    USPC .......................................... 709/223; 705/1.1
    See application file for complete search history.

(56) References Cited

U.S. PATENT DOCUMENTS

| | | | | |
|---|---|---|---|---|
| 7,970,888 | B2* | 6/2011 | Davies | H04L 47/10 709/223 |
| 8,489,720 | B1* | 7/2013 | Morford | H04L 41/0896 709/223 |
| 9,215,275 | B2* | 12/2015 | Kannan | H04L 67/1002 |
| 9,548,924 | B2* | 1/2017 | Pettit | H04L 47/125 |
| 9,609,052 | B2* | 3/2017 | Jalan | H04L 67/1008 |
| 9,767,478 | B2* | 9/2017 | Lawrence | G06F 17/30864 |
| 9,806,983 | B2* | 10/2017 | Civanlar | H04L 45/02 |
| 2004/0128379 | A1* | 7/2004 | Mizell | G06F 11/3423 709/224 |
| 2004/0213155 | A1* | 10/2004 | Xu | H04L 41/5003 370/232 |
| 2007/0058525 | A1* | 3/2007 | Arrowood | H04L 41/0663 370/216 |
| 2007/0255830 | A1* | 11/2007 | Alt | G06Q 10/06 709/226 |
| 2009/0210876 | A1* | 8/2009 | Shen | G06F 9/505 718/100 |
| 2009/0319638 | A1* | 12/2009 | Faith | G06Q 30/06 709/219 |
| 2009/0319686 | A1* | 12/2009 | Watanabe | H04L 45/00 709/240 |
| 2010/0010906 | A1* | 1/2010 | Grecia | G06Q 20/102 705/21 |
| 2010/0138569 | A1* | 6/2010 | Fuerst | G06F 13/1663 710/36 |
| 2011/0191237 | A1* | 8/2011 | Faith | G06F 1/1694 705/39 |
| 2012/0084419 | A1* | 4/2012 | Kannan | H04L 67/1002 709/223 |
| 2012/0131222 | A1* | 5/2012 | Curtis | H04L 47/2441 709/235 |
| 2013/0083669 | A1* | 4/2013 | Harris | H04W 24/04 370/242 |
| 2014/0226658 | A1* | 8/2014 | Kakadia | H04L 43/0882 370/389 |
| 2014/0325649 | A1* | 10/2014 | Zhang | H04L 43/024 726/23 |
| 2015/0009830 | A1* | 1/2015 | Bisht | H04L 47/125 370/236 |
| 2016/0042014 | A1* | 2/2016 | Jalan | H04L 67/1012 707/610 |

FOREIGN PATENT DOCUMENTS

| | | | | |
|---|---|---|---|---|
| CN | 101938401 | A * | 1/2011 | ............ H04W 28/02 |
| CN | 101938401 | A * | 1/2011 | ............ H04W 28/02 |
| CN | 103150241 | | 6/2013 | |
| CN | 103227838 | | 7/2013 | |
| CN | 103297477 | | 9/2013 | |
| WO | WO 2004/002077 | A1 | 12/2003 | |

OTHER PUBLICATIONS

International Search Report dated Apr. 3, 2015 in International Application No. PCT/CN2014/095765.
Written Opinion dated Apr. 3, 2015 in International Application No. PCT/CN2014/095765.

* cited by examiner

DISTRIBUTED FLOW CONTROL

PRIORITY STATEMENT

This application is a continuation of International Application No. PCT/CN2014/095765, filed on Dec. 31, 2014, in the State Intellectual Property Office of the People's Republic of China, which claims the priority benefit of Chinese Patent Application No. 201310754752.2 filed on Dec. 31, 2013, the disclosures of which are incorporated herein in their entirety by reference.

TECHNICAL FIELD

The present disclosure relates to technology of network flow control. Specifically, the present disclosure relates to methods, servers and systems for distributed flow control.

BACKGROUND

Request data flow, or data flow, refers to control of flow of requests in a network environment. For example, in a transaction system a request may be a transaction request. Flow control may include management of request distribution and/or proper handling of a request, such as whether to refuse or queue a request. Flow control is critical for Internet service provider (ISP) when responding to users' in online activities, such as online browsing, Express Payment, etc. For example, WeChat is a social communication platform allowing registered user to conduct online instant messaging, writing blogs, and make online payment etc. A WeChat user may use WeChat to browse Internet content (e.g., blogs, webpages, etc.). When the user binds his/her WeChat account with a bank account, the user may also use WeChat to conduct a Express Payment without having to login the bank account. Flow control is critical to these services. This is because some ISPs, such as WeChat with Express Payment, have massive user bases. Thus the number of requests the ISPs received every day is massive. Also, users of the social communication platform, such as WeChat, can be active at any time during a day and can stay active for a long period of time. Thus the ISP may receive requests from users at any time of the day and any day during a week. Further, often times the ISP relies on unstable third party service providers to process its service to users. For example, Express Payment may rely on unstable service from banks to process transaction requests from the massive users of WeChat. It is challenging to provide a stable service to users based on the unstable service of the third party service provider.

Generally, traditional flow control is implemented using empirical threshold of static configuration. Specifically, empirical threshold of static configuration is configured to limit data flow when the data flow of a computer (e.g., a server) exceeds the empirical threshold. However, the method is depended on empirical threshold of static configuration. For an Internet service provider adopting distributed flow control, the static configuration needs manual maintenance and it is vulnerable to human error. Besides, the simplex flow control mode, based on empirical thresholds, may lead to load unbalanced and insufficient use of resources.

SUMMARY

The present disclosure provides methods, servers and systems for distributed flow control, to avoid mistakes and waste in the use of resources.

According to an aspect of the present disclosure, a management server may provide data flow distribution control to a computer server system that provides online services to users, wherein the computer server system provides online services to users and includes a bus cluster, a plurality of caller systems including a plurality of computer servers, and a plurality of callee clusters including a plurality of computer servers. The management server may comprise a processor-readable storage medium storing a set of instructions for providing the distributed flow control, and a processor in communication with the storage medium to execute the set of instructions. When the processor executes the set of instructions, the processor is programmed to receive from the bus cluster health condition data of a callee cluster of the plurality of callee cluster in a first operation cycle of the computer server system; determine whether the callee cluster is slow or abnormal based on the health condition data in the first cycle; adjust a data flow limit in the bus cluster in a second cycle of the computer server system after the first cycle according to whether the callee cluster is slow or abnormal in the first cycle; and direct the bus cluster to control the data flow of the computer servers in the bus cluster in the second cycle according to the adjusted data flow limit.

According to another aspect of the present disclosure, a method of distributed flow control may comprise providing a computer server system configured to provide online services to users, wherein the computer server system comprises a plurality of bus clusters including a plurality of computer servers, a plurality of caller systems including a plurality of computer servers, and a plurality of callee clusters including a plurality of computer servers, and a management daemon; receiving, by the management daemon, health condition data issued by a bus cluster in a first operation cycle of the computer server system;

determining, by the management daemon, whether a callee cluster is slow or abnormal based on the health condition data in the first cycle; adjusting, by the management daemon, a data flow limit of computer servers in the bus cluster in a second cycle of the computer server system after the first cycle according to whether the callee cluster is slow or abnormal in the first cycle; and controlling, by the management daemon, the data flow of the computer servers in the bus cluster in the second cycle according to the adjusted data flow limit.

The method, server and system for distributed flow control may determine whether the callee cluster is slow or abnormal according to the received health condition data reported by bus cluster and adjust the computer server data flow limit of the bus cluster according to the result of determining whether the callee cluster is slow or abnormal and this enables the computer server data flow limit of bus cluster to be adjusted automatically according to the health condition of the callee cluster. Therefore, the computer server data flow limit is dynamically changeable and this may be adapted to health condition of callee cluster. The flow control mode in accordance with health condition of the callee cluster enables to avoid load unbalance and waste of resource.

In addition, there is no need of empirical threshold value of static configuration for each the computer server, so that the method is not vulnerable to human errors.

DESCRIPTION OF EXAMPLE EMBODIMENTS

In order to further illustrate the present disclosure in detail, the objects, technical scheme and advantages of the present disclosure are introduced clearly with drawings and example embodiments. It should be noticed that all example embodiments described below are intending to illustrate, rather than to limit the present disclosure.

Unless otherwise stated clearly, the amount of each component or unit in the present disclosure may be one or more, which is not limited in the present disclosure. Though the steps are arranged with number in the present disclosure, it does not intend to limit the order of them. Unless specific order is given or execution of some step is based on other steps, the order of steps is adjustable. It should be understood that the term "and/or" used in the text relates to and covers one of the related items in list, or any and all possible combinations of several items.

Figure 13:
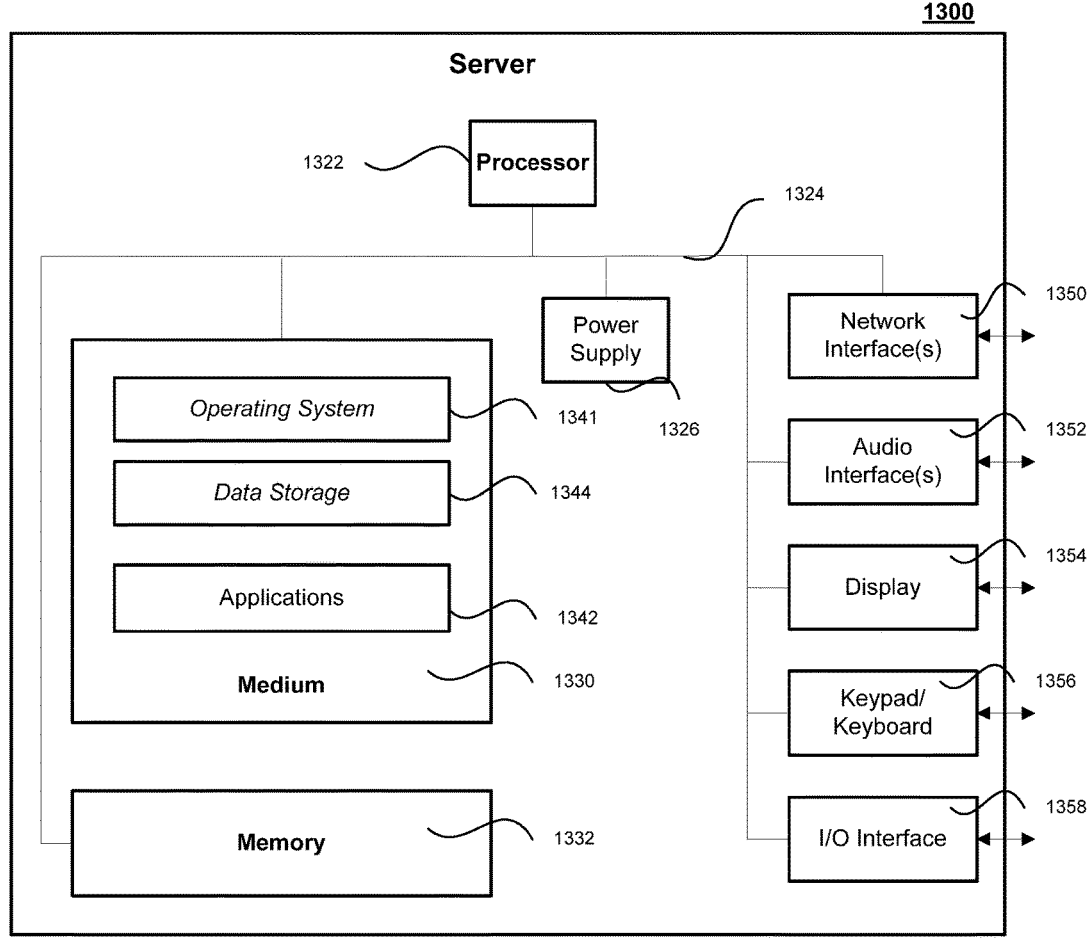
FIG. 13 is a schematic diagram illustrating an example embodiment of an the computer server in a distributed flow control system according.

FIG. 13 is a schematic diagram illustrating an example embodiment of a computer server, as described in the present disclosure. The computer server 1300 may be a server or serves as a node in the systems described in the present disclosure. The computer server 1300 may vary widely in configuration or capabilities, but it may include one or more central processing units 1322 and memory 1332, one or more medium 1330 (such as one or more non-transitory mass storage devices) storing application programs 642 or data 1344. The processing units 1322 may execute the application programs 1342 or data 1344 to perform methods disclosed in the present disclosure.

The computer server 1300 may further include, one or more power supplies 1326, one or more wired or wireless network interfaces 1350, one or more input/output interfaces 1358, and/or one or more operating systems 641, such as Windows SERVER™, MAC OS™, UNIX™, LINUX™, FREEBSD™, or the like. Thus a computer server 1300 may include, as examples, dedicated rack-mounted servers, desktop computer servers, laptop computer servers, set top boxes, mobile computational devices such as smart phones, integrated devices combining various features, such as two or more features of the foregoing devices, or the like. Examples of devices that may operate as a computer server include desktop computer servers, multiprocessor systems, microprocessor type or programmable consumer electronics, etc.

Merely for illustration, only one processor will be described in the computer server 1300 that executes operations and/or method steps in the following example embodiments. However, it should be note that the computer server 1300 in the present disclosure may also include multiple processors, thus operations and/or method steps that are performed by one processor as described in the present disclosure may also be jointly or separately performed by the multiple processors. For example, if in the present disclosure a processor of computer server 600 executes both step A and step B, it should be understood that step A and step B may also be performed by two different processors jointly or separately in computer server 600 (e.g., the first processor executes step A and the second processor executes step B, or the first and second processors jointly execute steps A and B).

Figure 1:
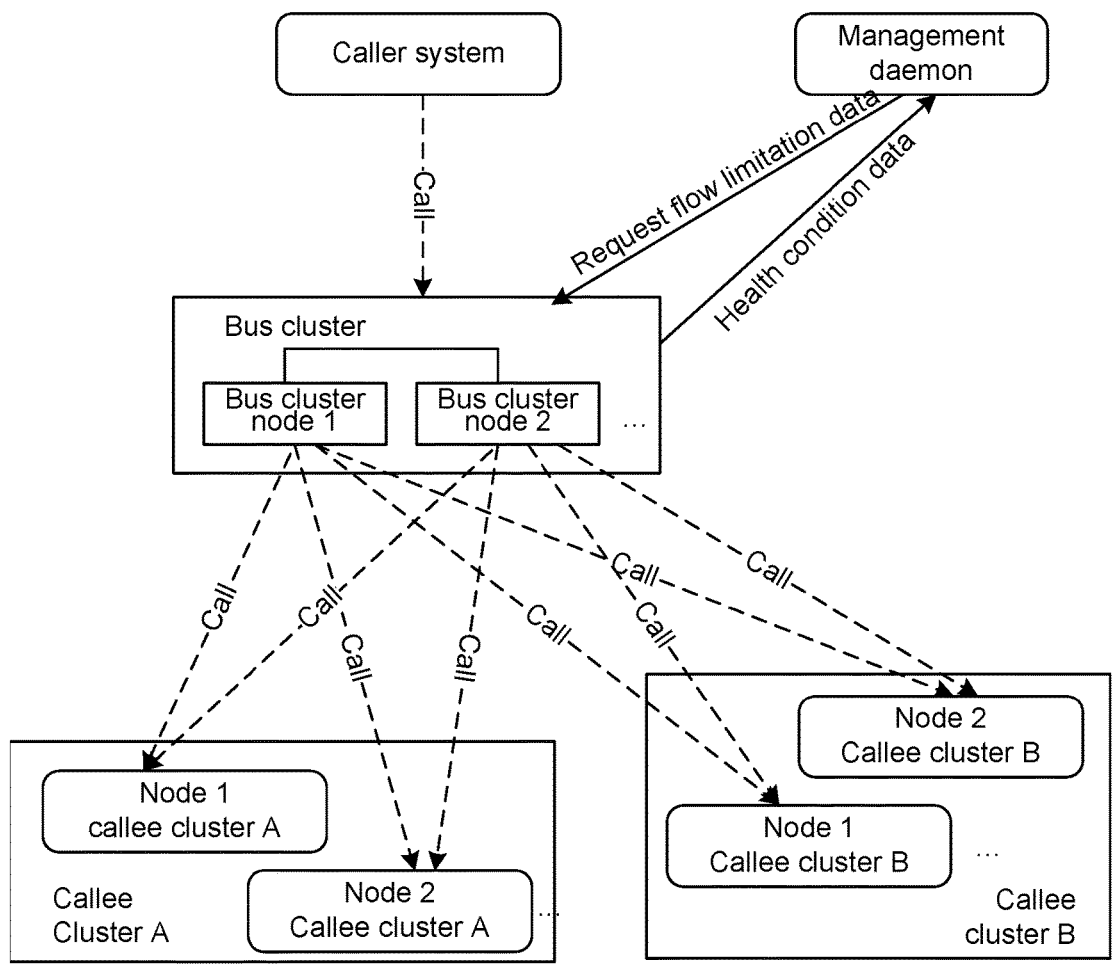
FIG. 1 shows a system diagram that applies a method of distributed flow control in an example embodiment.

FIG. 1 shows a system diagram that applies methods of distributed flow control as introduced in the present disclosure. For example, the system may be an integrated service system. An integrated service system may be a system that integrated multiple services, such as atomic services. Each atomic service may be a minimum service unit that is logically complete. For example, the integrated service system may be a payment service (e.g., Express Payment) that is integrated in a social communication platform (e.g., WeChat). The integrated service system may provide an online payment service that requires a plurality of data inquiries and a plurality of data processing steps. Each individual data inquiry and each step of data processing may be an atomic service. With these atomic service, the online payment service may comprise at least basic defensive programs and provide pre-posing checks during an online transaction, thereby reducing risks thereof.

The system may comprises one or more caller systems that send request to the system, one or more bus clusters, one or more callee clusters, and at least one management daemon managing operations of the system. A caller system may be a front-end service integration logic (e.g., an interface of the integrated service system that receive payment request from end user devices) that calls a back-end sub-service system (e.g., a bank, or an interface of the integrated service system that communicates with the bank) to process a sub-service request, such as an atomic service. A callee cluster may be the back-end sub-service system that receives and processes the sub-service request from the caller system. The caller system (or the front-end system) may divide a service request into a plurality of sub-service request and send the sub-service request to one or more callee clusters (or the back-end cluster) to process, and then integrated corresponding results returned from the one or more callee clusters into a complete response to the service request. The at least one management daemon may be a computer server. Further, each bus cluster may comprise a plurality of bus cluster node, which may comprise one or more computer servers, such as computer server 1300. Each callee cluster may also comprise one or more computer servers, such as computer server 1300.

The bus cluster, namely service bus, is the bus in SOA (service-oriented architecture). The request of caller system is distributed through bus cluster route to various callee clusters for processing. After receiving response of responding module in callee cluster, the bus cluster returns the response to the caller system. The bus cluster enables the caller system to pay no attention to the specific communication protocol and configuration position, and the bus cluster is mainly used to provide a uniform communication protocol to external the computer server. All the caller system needs to do is to call the bus cluster. The bus cluster is arranged in a distributable way, and composed with clusters of several the computer servers (bus nodes). In the FIG. 1, only two bus nodes are shown. However, it should be understood that the amount of the computer server in the bus cluster is not limited in the example embodiment.

The management daemon is interactive with the bus cluster and is used to manage the data flow limit data of the computer server in the bus cluster. The management daemon may issue data flow limit data to a bus cluster and the computer server in the bus cluster controls data flow of its own according to corresponding data flow limit data. The bus cluster may compute health condition data of callee cluster and report the health condition data of callee cluster to the management daemon. Thereby, the management daemon may generate various data flow limit data according to health condition data of callee cluster. Wherein, the management daemon and the bus cluster may be arranged in a same machine room or in server of different location.

Figure 2:
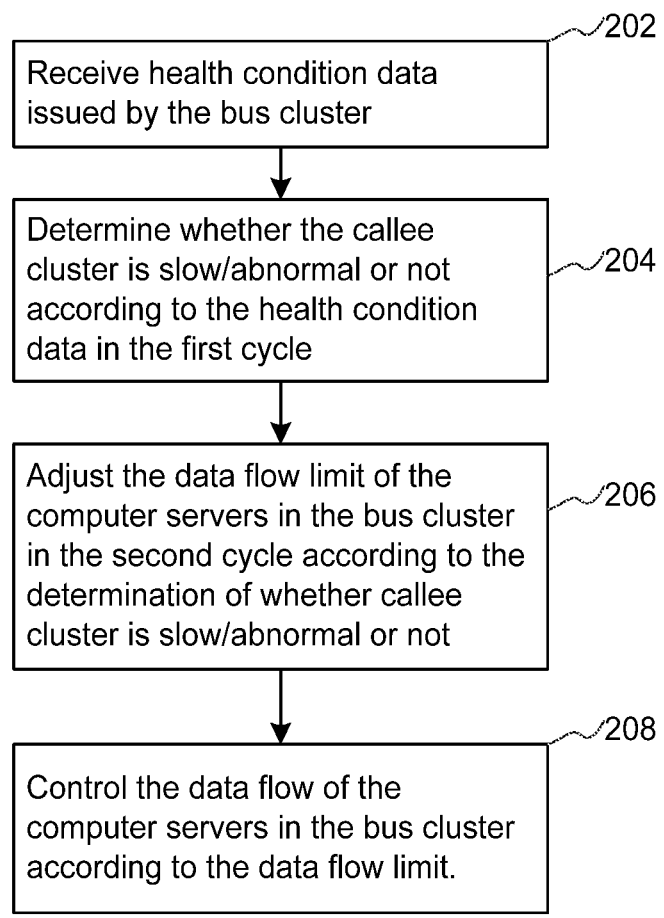
FIG. 2 shows a data flow diagram of the method of distributed flow control according to example embodiments of the present disclosure.

FIG. 2 shows a data flow diagram of the method of distributed flow control according to example embodiments of the present disclosure. The method may comprise steps described below.

Step 202, receiving, by the management daemon, health condition data issued by the bus cluster in a first cycle.

Here, a cycle may refer to a period of time that the bus cluster reports the health condition to the management daemon. The management daemon may also issue flow control instruction based on the cycle. The health condition of a callee cluster may refer to information about average time that the callee cluster has taken to response to request. The health condition data of the callee cluster contains time consumption data and processing result data of the callee cluster, in which the time consumption data is used to determine whether the callee cluster is slow or not, and the processing result data is used to determine whether the callee cluster is abnormal or not. In an example embodiment, the bus cluster may identify several service dimensions from the received request string, so that the health condition data of the callee cluster on a same service dimension will be integrated and reported. Wherein, the service dimension is a certain category of service request with respect to a particular service. For example, service dimensions for the Express Payment service may include payment transaction operations and stock transaction operations, etc. The callee cluster called by different dimensions may be different.

Further, the bus cluster may report the health condition of the callee cluster with fixed interval (reporting cycle). For example, the preferable reporting cycle may be 1 minute, or may be some other predetermined period of time.

Step 204, determining, by the management daemon, whether the callee cluster is slow/abnormal or not according to the health condition data in the first cycle.

The health condition data of the callee cluster contains time consumption data and processing result data of the callee cluster, in which the time consumption data is used to determine whether the callee cluster is slow or not, and the processing result data is used to determine whether the callee cluster is abnormal or not. The management daemon may first collect health condition data from the callee cluster in the first cycle of system operation (i.e., the first cycle), and then during a next cycle, the management daemon may determine whether the callee cluster is healthy (i.e., slow/abnormal or not according to the health condition data in the first cycle).

Step 206, adjusting, by the management daemon, data flow limit of the computer server in the bus cluster with respect to the callee cluster in a second cycle based on a result about whether callee cluster is slow/abnormal or not.

The second cycle is performed after the first cycle, so that the data flow of current cycle (i.e., the second cycle) may be controlled based on the health condition of previous cycle (i.e., the first cycle).

The method of adjusting data flow limit of the computer server in the bus cluster in the second cycle is preferably to adjust the upper data flow limit corresponding to the computer server. The upper data flow limit means a data flow limit value of a certain the computer server, which may not be exceeded. The adjustment of upper data flow limit of the computer server of the bus cluster in the current cycle based on the health condition data of the bus cluster in previous cycle enables reasonable data flow distribution.

Step 208, controlling, by the management daemon, the data flow of the computer server in the bus cluster according to the adjusted data flow limit in the second cycle.

In the example embodiment, there may be obtained upper data flow limit for each computer server in the bus cluster. After the upper data flow limit of the computer server of the bus cluster in the second cycle, the upper data flow limit corresponding to the computer server may be transmitted to the bus cluster, and the computer server in the bus cluster may limit its data flow within corresponding upper data flow limit.

Because the computer server data flow limit of the bus cluster may be adjusted automatically according to the health condition of the callee cluster, the computer server data flow limit is dynamically changeable and it may be adapted to health condition of the callee cluster. The flow control mode, in accordance with health condition of the callee cluster, may avoid load unbalance and make full use of resource without waste. In addition, there is no need of empirical threshold value of static configuration for each the computer server, so that the method does not cause mistake easily.

Figure 3:
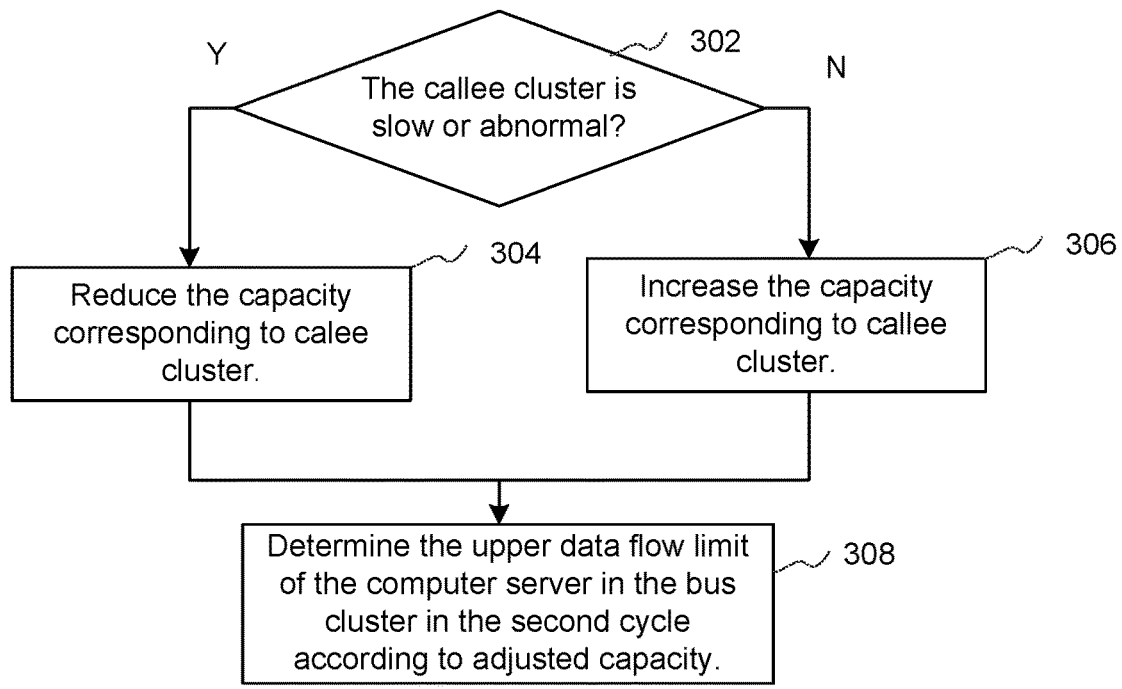
FIG. 3 shows a data flow diagram of adjusting upper data flow limit of a computer server according to example embodiments of the present disclosure.

FIG. 3 shows a data flow diagram of adjusting upper limit of data flow of a computer server according to example embodiments of the present disclosure. The step of adjusting data flow limit of the computer server in the bus cluster in the second cycle according to result of whether the callee cluster is slow/abnormal or not may further comprise the following steps:

Step 302, determining, by the management daemon, whether the callee cluster is slow/abnormal or not; if it is, executing step 304; if not, executing step 304;

Step 304, reducing, by the management daemon, corresponding capacity of the callee cluster; and Step 306, increasing, by the management daemon, corresponding capacity of the callee cluster.

Here, the corresponding capacity of the callee cluster is the capacity that the callee cluster may support for one service dimension.

Step 304 is to reduce the corresponding capacity of the callee cluster by the default percentage of initial value of capacity. Step 306 is to increase corresponding capacity of the callee cluster by the default percentage of initial value of capacity. For example, in case that the current corresponding capacity of the callee cluster is C1, initial value of capacity is C0 and preset percentage is z %, when it is determined that the callee cluster is slow or abnormal, the capacity of the callee cluster after reducing step will be C1-C0*z %.

In an example embodiment, once it is determined that the callee cluster is slow/abnormal, the step of reducing capacity will be executed until it reaches the lower limit of capacity. For example, the lower limit may be n request/second, in which the n is an amount of the computer servers in the bus cluster. In an example embodiment, once it is determined that the callee cluster is not slow/abnormal, the step of increasing capacity will be executed till it reaches the upper limit (maximum) of capacity. For example, the upper limit is an initial value of the capacity (the value of capacity corresponding to the initially preset the bus cluster).

In another example embodiment, each time after the capacity corresponding to the callee cluster is increased, it is necessary to determine whether the capacity corresponding to the callee cluster has reached the upper limit of capacity (maximum). If it has, stop further increasing and set the upper limit of capacity as capacity corresponding to the callee cluster. For example, the upper limit may be initial value of support value.

Step 308, determining, by the management daemon, the upper data flow limit (e.g., data flow threshold) of the computer server in the bus cluster in the second cycle according to capacity after adjustment.

In an example embodiment, the maximum between the two values below is taken as the upper data flow limit (e.g., data flow threshold) of the computer server in the bus cluster in the second cycle: (1) product of the capacity after adjustment and rate of the computer server data flow in the first cycle with the total data flow of the computer servers; (2) rate of the capacity after adjustment with the amount of the computer servers.

For example, the upper data flow limit of a certain computer server in the bus cluster in the second cycle may be calculated according to formula below: Max(C*q/Q, C/n), in which Max represents maximum between the two values, C represents the capacity corresponding to the bus cluster after adjustment, q is data flow of the particular computer server at issue in the first cycle, Q is the total data flow amount of all the computer servers in the bus cluster in the first cycle, and n is the number of the computer servers in the bus cluster.

By determining that during the second cycle the upper limit of the data flow (i.e., upper data flow limit, such as the data flow threshold) of the computer server in the bus cluster is the maximum of the above two values, a certain lower limit is ensured to the upper limit of the data flow of the computer server. Namely, the upper data flow limit of the computer server should not be lower than Max(C*q/Q, C/n), the lower limit value. This may help the computer server in the bus cluster from falsely rejecting a request from a computer server of the caller cluster, which may be caused by a low data flow limitation assigned to the computer server in the bus cluster by the management daemon. C/n is the average data flow of the computer server, which may be the lower limit in range of reasonable upper limit. However, regarding the computer server in bus cluster, an average value is not enough, because data flow imbalance may appear in one reporting cycle. Some computer servers should get more data flow, according to data flow distribution in previous cycle. Thus, if the value of C*q/Q is higher than C/n, the method will take C*q/Q as the lower limit.

Further, after upper data flow limit of the computer server in the bus cluster in the second cycle is obtained, the upper data flow limit may be transmitted to the bus cluster and the computer server in the bus cluster will be able to control its data flow within the corresponding upper data flow limit.

The step 308 may further comprise: obtaining and/or receiving, by the management daemon, a total data flow of the computer servers in the bus cluster in the second cycle; and in case that the total computer server data flow exceeds a preset capacity, the management daemon may make an alert to a administrator (e.g., a human administrator of the management daemon), wherein the preset capacity may be a certain times of capacity of the callee cluster. For example, the preset multiple is 1.

In this step, the bus cluster may calculate the total data flow of the computer servers in the bus cluster in one reporting cycle. In case that the total the computer server data flow exceeds the preset capacity of the callee cluster, the management daemon will generate the alert and send it to the administrator. When the total data flow of the computer server in the bus cluster in one reporting cycle exceeds the capacity of the callee cluster, the health condition of the callee cluster will decrease, and the management daemon will determine that the callee cluster is slow or abnormal according to the health condition data reported by the bus cluster. Thereby, the upper data flow limit of the computer server in the bus cluster in next cycle will be adjusted to get the data flow of the computer server in the bus cluster decreasing automatically.

In an example embodiment, the health condition data includes average time consumption, distribution data of time consumption and overtime rate of the callee cluster. Wherein, the average time consumption means average time spent by the callee cluster in processing a piece of request in one reporting cycle. Distribution data of time consumption means the proportion of request amount distributed in each time consumption section in all processed requests of the callee cluster in one reporting cycle. Overtime rate means the proportion of overtime request taking in total amount of requests in one reporting cycle. The step of determining whether the callee cluster is slow/abnormal or not according to the health condition data in first cycle may comprise: determining if the callee cluster in the first cycle may meet any condition or any combination of two or more below conditions: (1) the average time consumption of the callee cluster reaches first threshold value; (2) in the time consumption distribution data of the callee cluster, the request ratio in each time consumption interval (i.e., during a time period of each time consumption) is not in default range; (3) the overtime rate of the callee cluster reaches second threshold value. In case that the result is yes, it is determined that the callee cluster is slow.

The average time consumption, the distribution data of time consumption and the overtime rate are all time consumption data. Wherein, the average time consumption means average time spent by the callee cluster in processing a piece of request in one reporting cycle. Distribution data of time consumption means the proportion of request amount distributed in each time consumption section in all processed requests of the callee cluster in one reporting cycle. Wherein, the time consumption sections are arranged beforehand, including very fast (0-100 ms), relatively fast (100-500 ms), normal (500 ms-2 s) and slow (>2 s), as well as other sections. For example, the proportion of request amount in time consumption section of very fast is 55%. A range may be set beforehand, and it may be determined that the callee cluster is slow in case that the request ratio in each time consumption section is not in the preset range. For example, it may be set that at least 50% of the request ratio in time consumption section should be fast, or no more than 20% of the request ratio in time consumption section is slow, or the like. Overtime rate means the proportion of overtime request taking in total amount of requests in one reporting cycle. An overtime threshold may be set then. After a request is transmitted to the callee cluster, if the bus cluster does not receive, within the overtime threshold, the result returned by the callee cluster, it will be determined that the request is overtime. Wherein, the overtime threshold may preferably choose maximum between the two values below: (1) average time consumption of each request of the callee cluster in the slowest day during the late preset period; (2) preset lower experience limit value.

Further, it may be set as below: in case that it is determined that the callee cluster in the first cycle may meet any condition or any combination of two or more conditions among the three above conditions, it is considered that the callee cluster is slow and the data flow limit in the second cycle will be controlled and adjusted according to data flow data (such as total data flow of all the computer servers, data flow of single the computer server in the bus cluster in the first cycle, and so on) in the first cycle. There, the second cycle is the next cycle of the first cycle.

The health condition data may further include success rate and error rate; the step of determining whether the callee cluster is slow/abnormal or not according to the health condition data in first cycle may comprise: determining if the callee cluster in the first cycle may meet any condition or combination of the two conditions below; (1) success rate of the callee cluster is lower than a third threshold value; (2) error rate of the callee cluster reaches a forth threshold value; in case that the result is yes, determining that the callee cluster is abnormal.

Success rate and error rate are all processing result data. Wherein, the success rate means the proportion of request processed successfully by the callee cluster taking into account all requests in one reporting cycle. Error rate means the proportion of request with error returning of the callee cluster taking into account all requests. The bus cluster may identify system error (namely error report caused by non-service reason) from error codes returned by the callee cluster through identifying prefix or with a blacklist. The bus cluster may calculate the proportion of the system error returned by the callee cluster in one reporting cycle taking in all requests, which is just the error rate. It may be set as below: in case that it is determined that if the callee cluster in the first cycle meets any condition or any combination of the two conditions above, it is concluded that the callee cluster is abnormal and adjustment will be made according to the data flow data in the first cycle.

Figure 4:
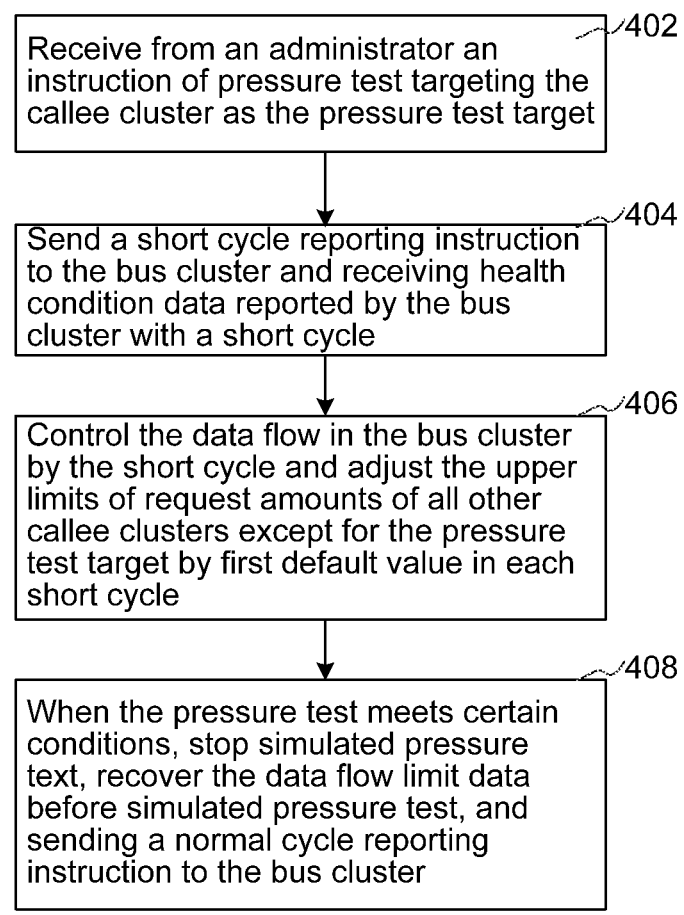
FIG. 4 shows a data flow diagram of a simulated pressure test in an example embodiment.

FIG. 4 shows a data flow diagram of simulated pressure test in an example embodiment. The method of distributed flow control provided in the present disclosure may be further used to execute simulated pressure test. As shown in FIG. 4, the method of simulated pressure test may comprise the following steps.

Step 402, receiving, by the management daemon, from an administrator of the management daemon an instruction of pressure test targeting the callee cluster as the pressure test target.

In the example embodiment, the administrator may set a service dimension into a pressure test mode through an configuration interface of the management daemon and assign a callee cluster as the target of pressure test (i.e., pressure test target).

Step 404, sending, by the management daemon, a short cycle reporting instruction to the bus cluster and receiving health condition data reported by the bus cluster with a short cycle.

The short cycle means a cycle far shorter than normal reporting cycle. After the bus cluster receives the short cycle reporting instruction, the short cycle reporting instruction will assign an amount of continuous short cycles to the bus cluster, i.e., the bus cluster will be informed how many short cycles will be needed for the pressure test. The bus cluster will then report the health condition data according to the short cycle.

Step 406, controlling, by the management daemon, the computer server data flow in the bus cluster by the short cycle and adjusting (e.g., reducing) upper limits of request amounts of all other callee clusters except for the pressure test target by first default value in each short cycle.

After the management daemon receives the health condition data reported by the bus cluster according to the short cycle, it may use the method of distributed flow control provided in the above example embodiments to control the data flow of the computer servers in the bus cluster in one short cycle according to the health condition data reported by the bus cluster by short cycle. The control will last for preset amount of short cycles. Besides, in each short cycle, the upper limits of request amounts of all callee clusters except for the pressure test target to the first default value, so that there will be increasing amount of requests distributed in to callee clusters serving as the pressure test target. Wherein, the first default value is preferably the ratio of request amounts, of all callee clusters except for the pressure test target before reducing request amount, to counts of continuous short cycles.

Step 408, when the pressure test meets certain predetermined conditions, stopping, by the management daemon, simulated pressure test, recovering the data flow limit data before simulated pressure test, and sending a normal cycle reporting instruction to the bus cluster.

The pressure test meets the predetermined conditions when any of the below conditions or any combination of the below conditions occur: (1) except for the request amount of the pressure test target, the request amount of all other callee clusters decreases to the second default value; (2) the pressure test target is slow or abnormal. For example, the second default value may be 0 requests per second. When the pressure test meets any condition or any combination of the two conditions above, the pressure test target reaches its limit. Then, it is time to stop pressure test. The management daemon transmits the data flow limit data before pressure test to the bus cluster. The data flow limit data contains capacity of the callee cluster and upper data flow limit of each of the computer servers before simulated pressure test, and so on. The management daemon transmits normal cycle reporting instruction to the bus cluster. Then the bus cluster will carry on reporting health data of the callee cluster in one reporting cycle by the reporting cycle before simulated pressure test and carry on controlling data flow by previous normal reporting cycle.

In the example embodiment, when simulated pressure test is targeting to a service dimension, the corresponding callee cluster may be selected. The administrator just needs to input an instruction through configuration interface. Besides, the measurement is executed on the real service request in the process of simulated pressure test. The simulated pressure test may help getting aware of real processing capacity of each node in the callee cluster. Besides, the simulated pressure test may stop automatically and does not affect processing request of real service.

With reference to FIG. 1, for a service dimension (namely a type of service request), the callee system connected with the bus cluster may provide a completely the same function and form one cluster (In the FIG. 1 only two bus nodes are shown and only two nodes are shown in one callee cluster. However, it should be understood that amount of the computer servers in the bus cluster and amount of nodes in the callee cluster are not limited by the drawing) by different configuration properties (such as the computer server room, special line or the like). These callee clusters with the same functions but different configuration properties are also named as allogeneic callee clusters. With the method of distributed flow control provided in the example embodiments, the bus cluster may calculate the health condition data of the allogeneic callee clusters respectively and report the data to the management daemon. The management daemon adjusts the data flow limit corresponding to the computer servers in the bus cluster and sends data flow limit data to the bus cluster. Thereby, the bus cluster may control the data flow of the callee cluster according to the data flow limit data. A request of caller cluster reaches the bus cluster and the bus cluster will route and distribute the request to several callee clusters of a same service dimension. If a callee cluster reaches its flow control threshold value (health condition decreases), the bus cluster will not reject the request but route it to other callee cluster. Therefore, in case that health condition of some callee cluster among several callee clusters of a same service dimension decreases, the management daemon will adjust the data flow limit of the computer server in the bus cluster in order to get the bus cluster removing request amount to other callee cluster of better health condition, and this realizes flexible disaster recovery. Compared with traditional disaster recovery switch technique of manual switch or complete switch, the method of distributed flow control provided by example embodiments of the present disclosure may release performance deterioration by reducing the amount, accelerate health condition recovery of the callee cluster and apply flow control technique to disaster capacity. Besides, the method may improve performance of whole system.

Figure 5:
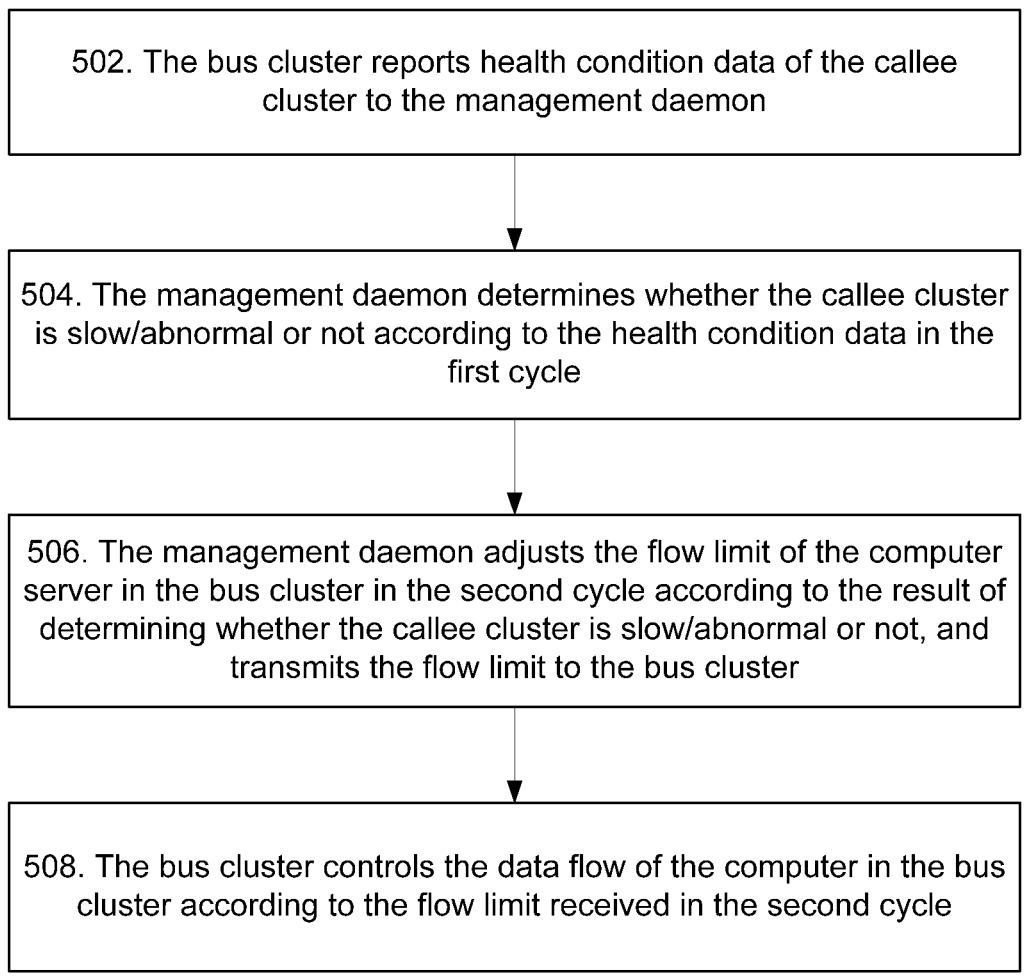
FIG. 5 shows a data flow diagram of the method of distributed flow control in another example embodiment.

In an example embodiment as shown in FIG. 5, there is provided a method of distributed flow control, which is illustrated with the system shown in FIG. 1. The method may comprise the steps as below.

Step 502, the bus cluster reports health condition data of the callee cluster to the management daemon.

The bus cluster may get health condition data of the callee clusters of a same service dimension and integrate the health condition data of the callee clusters of a same service dimension by preset reporting cycle.

Step 504, the management daemon determines whether the callee cluster is slow/abnormal or not according to the health condition data in first cycle.

The health condition data of the callee cluster contains time consumption data and processing result data, in which the time consumption data is used to determine whether the callee cluster is slow or not, and the processing result data is used to determine whether the callee cluster is abnormal or not.

Step 506, the management daemon adjusts data flow limit of the computer server in the bus cluster in the second cycle according to the result of determining whether the callee cluster is slow/abnormal or not, and transmits the data flow limit to the bus cluster.

The second cycle is the next cycle of the first cycle, so that it comes true in the example embodiment that the data flow of current cycle may be controlled according to the health condition of previous cycle.

In the step 506 of an example embodiment, the management daemon adjusts upper data flow limit of the computer server in the bus cluster in the second cycle according to the determining result.

Step 508, the bus cluster controls the data flow of the computer server in the bus cluster according to the data flow limit received in the second cycle.

In the example embodiment, the management daemon adjusts the data flow limit corresponding to each of the computer servers in the bus cluster in second cycle according to health condition of first cycle. Therefore, the computer server in the bus cluster may control the data flow according to corresponding data flow limit.

Because the computer server data flow limit of the bus cluster may be adjusted automatically according to the health condition of the callee cluster, the computer server data flow limit is dynamically changeable and it may be adapted to health condition of the callee cluster. The flow control mode, in accordance with health condition of the callee cluster, may avoid load unbalance and make full use of resource. In addition, there is no need of empirical threshold value of static configuration for each the computer server, so that the method does not cause mistake easily.

In an example embodiment, the management daemon adjusts capacity of the callee cluster according to result of determining whether the callee cluster is slow/abnormal or not, and then the management daemon determines upper data flow limit of the computer server in the bus cluster in the second cycle according to the capacity after adjustment.

Figure 6:
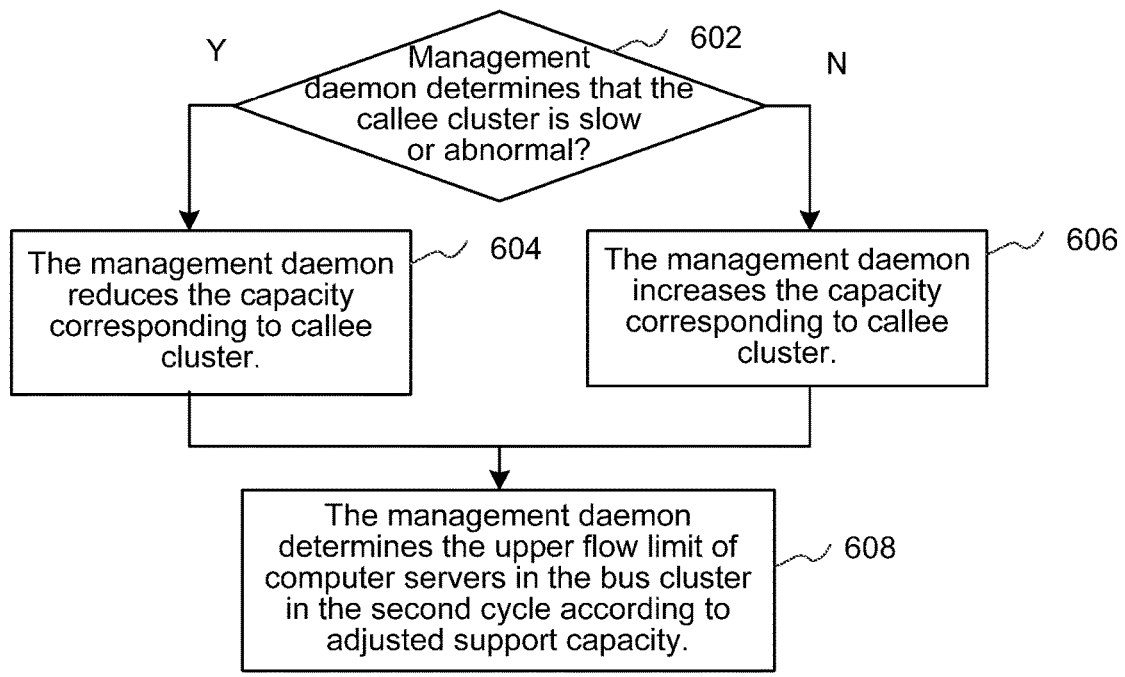
FIG. 6 shows a data flow diagram of adjusting upper data flow limit of an the computer server in another example embodiment.

In an example embodiment as shown in FIG. 6, the process of the management daemon adjusting data flow limit of the computer server in the bus cluster in the second cycle according to determining result may comprise the steps as below.

Step 602, the management daemon determines whether the callee cluster is slow/abnormal or not; if it is, executes step 604; if not, executes step 604.

Step 604, the management daemon reduces corresponding capacity of the callee cluster.

Step 606, the management daemon increases corresponding capacity of the callee cluster.

In step 604, the management daemon reduces corresponding capacity of the callee cluster by the default percentage of initial value of capacity. In the step 606, the management daemon increases corresponding capacity of the callee cluster by the default percentage of initial value of capacity. The default percentage may be set beforehand. Once the management daemon determines that the callee cluster is slow or abnormal, the step of reducing capacity will be executed for one time till it reaches the lower limit of capacity. Preferably, the lower limit is n request/second, in which the n is amount of the computer server in the bus cluster. Once the management daemon determines that the callee cluster is slow/abnormal, the step of increasing capacity will be executed for one time till it reaches the upper limit of capacity. Preferably, the upper limit is initial value of the capacity.

Step 608, the management daemon determines the upper data flow limit of the computer server in the bus cluster in the second cycle according to capacity after adjustment.

In an example embodiment, the maximum between the two values below is determined by the management daemon as the upper data flow limit of the computer server in the bus cluster in the second cycle: (1) product of the capacity after adjustment and rate of the computer server data flow in the first cycle with the total data flow of the computer server; (2) rate of the capacity after adjustment with the amount of the computer servers.

For example, the upper data flow limit of some the computer server in the bus cluster in the second cycle may be calculated by the management daemon according to formula below; Max(C*q/Q, C/n), in which Max represents maximum between the two values, C represents the capacity corresponding to the bus cluster after adjustment, q is data flow of the computer server in the first cycle, Q is the total data flow amount of all the computer servers in the bus cluster in the first cycle, and n is amount of the computer server in the bus cluster.

Further, after the management daemon gets upper data flow limit of the computer server in the bus cluster in the second cycle, it will transmit the upper data flow limit to the bus cluster, and the computer server in the bus cluster will be able to control the data flow of its own within the upper data flow limit.

In an example embodiment, the step of the bus cluster controlling the data flow of the computer server in the bus cluster in the second cycle according to the data flow limit may comprise sub-steps of: the bus cluster obtains the total data flow of the computer servers in the bus cluster in the second cycle; and in case that the total data flow exceeds preset multiple of capacity of the callee cluster, the bus cluster will make a warning.

In an example embodiment, the health condition data includes average time consumption, distribution data of time consumption and overtime rate of the callee cluster. The step of determining whether the callee cluster is slow/abnormal or not according to the health condition data in first cycle may comprise a sub-step of: determining if the callee cluster in the first cycle may meet any of the following conditions or any combination of the following conditions: (1) average time consumption of the callee cluster reaches first threshold value; (2) in the time consumption distribution data of the callee cluster, the request ratio in each time consumption interval is not in default range; (3) overtime rate of the callee cluster reaches second threshold value. In case that the result is yes, it is determined that the callee cluster is slow.

In an example embodiment, the health condition data further includes success rate and error rate. The step of the management daemon determining whether the callee cluster is slow/abnormal or not according to the health condition data in first cycle may comprise a sub-step of: determining if the callee cluster in the first cycle may meet any of the following conditions or combination of the following conditions: (1) success rate of the callee cluster is lower than third threshold value; (2) error rate of the callee cluster reaches forth threshold value. In case that the result is yes, determining that the callee cluster is abnormal.

Figure 7:
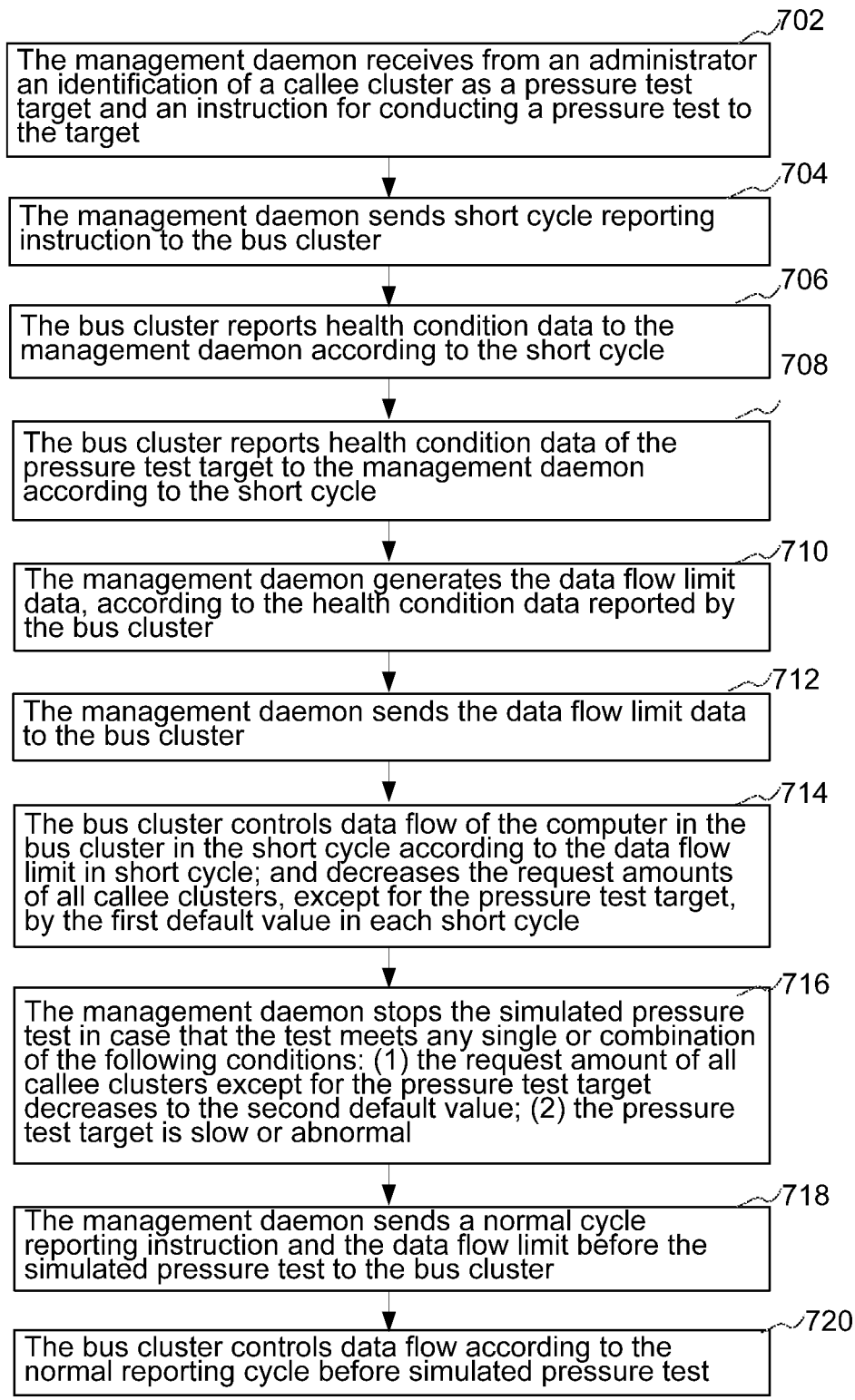
FIG. 7 shows a data flow diagram of simulated pressure test in another example embodiment.

In an example embodiment, the method may be further used to carry out simulated pressure test. As shown in FIG. 7, the process of simulated pressure test may comprise the following steps.

Step 702, the management daemon receives from an administrator an identification of a callee cluster as a pressure test target and an instruction for conducting a pressure test to the target.

Step 704, the management daemon sends short cycle reporting instruction to the bus cluster.

Step 706, the bus cluster reports health condition data to the management end according to the short cycle.

Step 708, the bus cluster reports health condition data of the pressure test target to the management daemon according to the short cycle.

Step 710, the management daemon generates the data flow limit data, according to the health condition data reported by the bus cluster.

Step 712, the management daemon sends the data flow limit data to the bus cluster.

Step 714, the bus cluster controls data flow of the computer server in the bus cluster in the short cycle according to the data flow limit in short cycle; and decreases the request amounts of all callee clusters, except for the pressure test target, by the first default value in each short cycle Step 716, the management daemon stops the simulated pressure test in case that the test meets any single or combination of the following conditions: (1) the request amount of all callee clusters except for the pressure test target decreases to the second default value; (2) the pressure test target is slow or abnormal.

Step 718, the management daemon sends a normal cycle reporting instruction and the data flow limit before the simulated pressure test to the bus cluster.

Step 720, the bus cluster controls data flow according to the normal reporting cycle before simulated pressure test.

Figure 8:
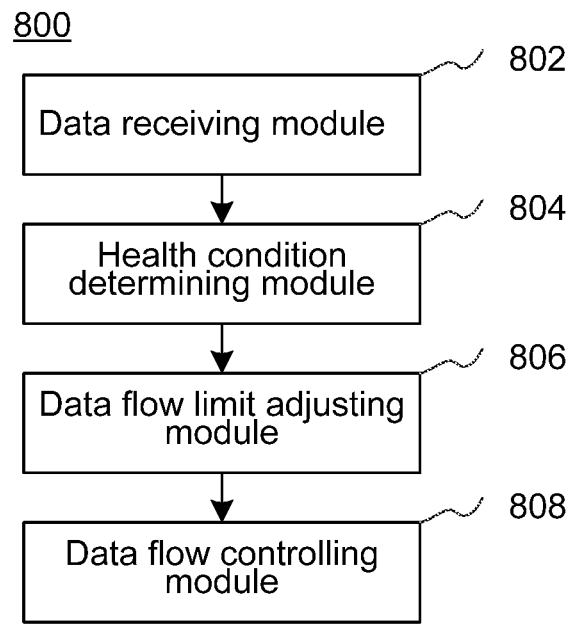
FIG. 8 shows structural diagram of a server in an example embodiment.

As shown in FIG. 8, in an example embodiment there is provided a server 800. The server may have a physical construction as the computer server 1300. Further, the server 800 may logically comprise:

A data receiving module 802, configured to receive health condition data issued by the bus cluster;

A health condition determining module 804, configured to determine whether the callee cluster is slow/abnormal or not according to the health condition data in first cycle;

A data flow limit adjusting module 806, configured to adjust data flow limit of the computer server in the bus cluster in the second cycle according to the result of the step of determining whether the callee cluster is slow/abnormal or not; and A flow controlling module 808, configured to control the data flow of the computer server in the bus cluster in the second cycle according to the data flow limit.

In the example embodiment, the data receiving module 802 is configured to receiving the health condition data of callee clusters of a same service dimension, integrated and reported by the bus cluster by reporting cycle. Wherein, the second cycle is the next cycle of the first cycle and it comes true in the example embodiment that the data flow of current cycle may be controlled according to the health condition of previous cycle.

In an example embodiment, the data flow limit adjusting module 806 is configured to adjust upper data flow limit of the computer server in the bus cluster in the second cycle according to the result of determining whether the callee cluster is slow/abnormal or not.

Figure 9:
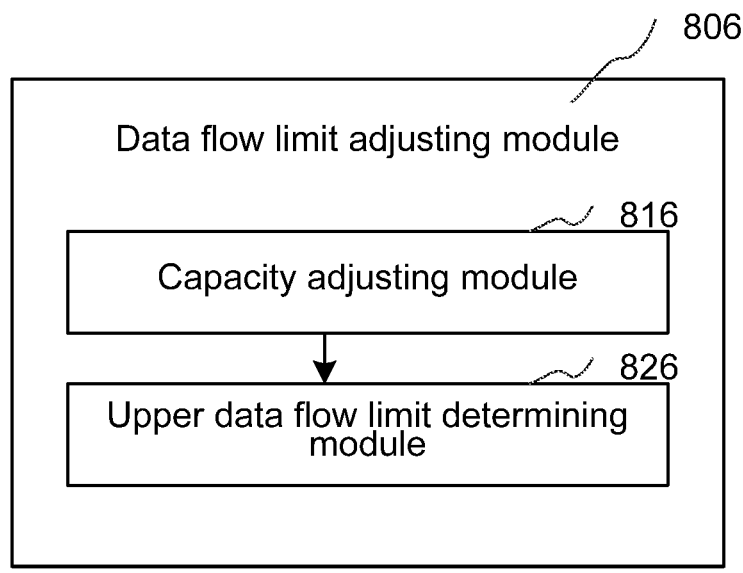
FIG. 9 shows structural diagram of the data flow limit adjusting module in an example embodiment.
Figure 10:
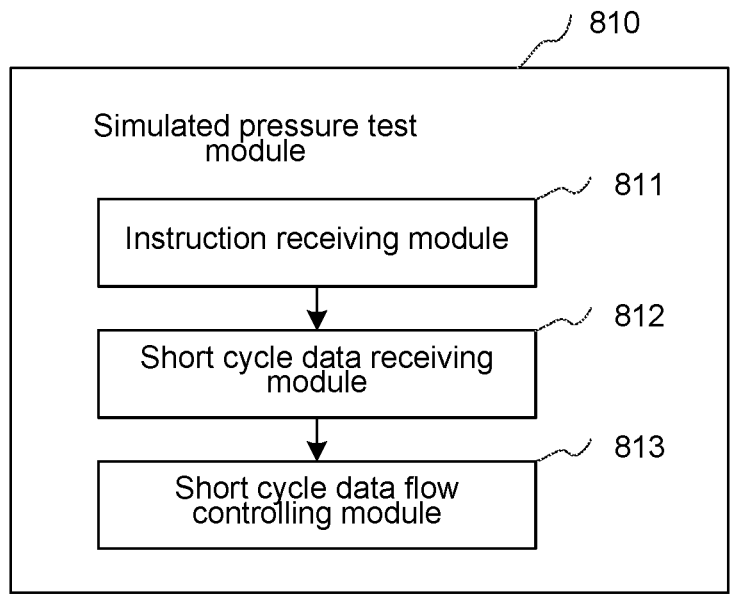
FIG. 10 shows a structural diagram of the server in another example embodiment.

In an example embodiment, as shown in FIG. 9, the data flow limit adjusting module 806 may comprise the followings.

A capacity adjusting module 816, configured to adjust capacity of the callee cluster according to the determining result.

The capacity adjusting module 816 is configured to reduce corresponding capacity of the callee cluster in case the callee cluster is slow/abnormal; and increase corresponding capacity of the callee cluster in case the callee cluster is not slow/abnormal.

Further, in an example embodiment, the capacity adjusting module 816 is configured to reduce corresponding capacity of the callee cluster by the default percentage of initial value of capacity and increase corresponding capacity of the callee cluster by the default percentage of initial value of capacity.

An upper data flow limit determining module 826, configured to determine upper data flow limit of the computer server in the bus cluster in the second cycle according to the capacity after adjustment.

Further, in an example embodiment, the upper data flow limit determining module 826 is configured to take the maximum between the two values below as the upper data flow limit of the computer server in the bus cluster in the second cycle: (1) product of the capacity after adjustment and rate of the computer server data flow in the first cycle with the total data flow of the computer server; (2) rate of the capacity after adjustment with the amount of the computer servers.

For example, the upper data flow limit determining module 826 is configured to calculate the upper data flow limit of some the computer server in the bus cluster in the second cycle according to formula below: Max(C*q/Q, C/n), in which Max represents maximum between the two values, C represents the capacity corresponding to the bus cluster after adjustment, q is data flow of the computer server in the first cycle, Q is the total data flow amount of all the computer servers in the bus cluster in the first cycle, and n is amount of the computer server in the bus cluster.

Further, the flow controlling module 808 may be configured to transmit the upper data flow limit to the bus cluster, after upper data flow limit of the computer server in the bus cluster in the second cycle is obtained, and the computer server in the bus cluster will be able to control its data flow within the upper data flow limit.

In an example embodiment, the flow controlling module 808 may be further configured to get total the computer server data flow of the bus cluster in the second cycle; and in case that the total the computer server data flow exceeds preset multiple of capacity of the callee cluster, make a warning.

In an example embodiment, the health condition data includes average time consumption, distribution data of time consumption and overtime rate of the callee cluster. The health condition determining module 804 is configured to determine if the callee cluster in the first cycle may meet any condition or any combination of two conditions or more below. In case that the result is yes, it is determined that the callee cluster is slow: (1) average time consumption of the callee cluster reaches first threshold value; (2) in the time consumption distribution data of the callee cluster, the request ratio in each time consumption interval is not in default range; (3) overtime rate of the callee cluster reaches second threshold value.

In the example embodiment or another example embodiment, the health condition data further includes success rate and error rate; the health condition determining module 804 is configured to determine if the callee cluster in the first cycle may meet any condition or combination of the two conditions below; in case that the result is yes, determining that the callee cluster is abnormal: (1) success rate of the callee cluster is lower than third threshold value; (2) error rate of the callee cluster reaches forth threshold value.

In an example embodiment, the server 800 further contains simulated pressure test module 810, which is may comprise:

An instruction receiving module 811, configured to receive the callee cluster input by administrator as a pressure test target and instruction for simulated pressure test on the pressure test target;

A short cycle data receiving module 812, configured to transmit short cycle reporting instruction to the bus cluster and receive health condition data reported by the bus cluster by short cycle; and A short cycle flow controlling module 813, configured to control the computer server data flow in the bus cluster by the short cycle and reduce upper limits of request amounts of all callee clusters except for the pressure test target by first default value in each short cycle.

Figure 11:
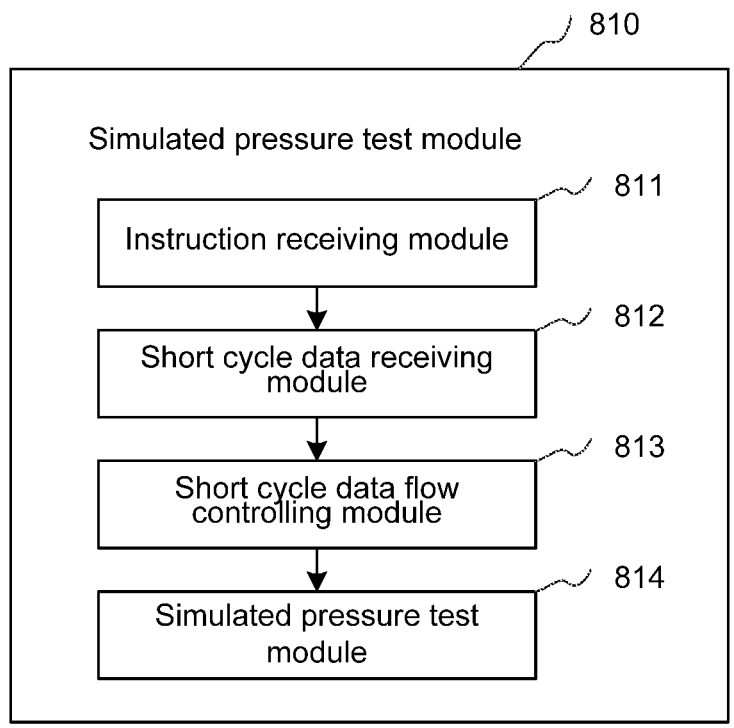
FIG. 11 shows a structural diagram of the simulated pressure test module in another example embodiment.

In the example embodiment, the short cycle flow controlling module 813 is configured to generate data flow limit data according to the health condition data reported by the bus cluster by short cycle, and transmit data flow limit data to the bus cluster. Thereby, the bus cluster will control the computer server data flow in the bus cluster by the short cycle according to the data flow limit data in short cycle;

In an example embodiment, as shown in FIG. 11, the simulated pressure test module 810 further may comprise:

A simulated pressure test module 814, configured to stop simulated pressure text, recover data flow limit data before simulated pressure test, and transmit normal cycle reporting instruction to the bus cluster, in case that it meets any condition or combination of the two conditions below: (1) request amount of all callee clusters except for the pressure test target decreases to second default value; (2) the pressure test target is slow or abnormal.

Figure 12:
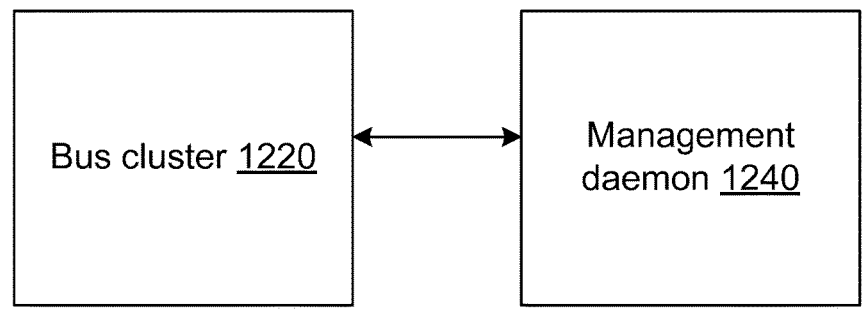
FIG. 12 shows a structural diagram of the system of distributed flow control in an example embodiment.

As shown is FIG. 12, in an example embodiment, there is provided a system 120 of distributed flow control, which may comprise:

The bus cluster 1220, configured to report health condition data of the callee cluster to the management daemon 1240; and The management daemon 1240, configured to determine whether the callee cluster is slow/abnormal or not according to the health condition data in first cycle.

In the example embodiment, the management daemon 1240 is further configured to adjust data flow limit of the computer server in the bus cluster 1220 in the second cycle according to result of determining whether the callee cluster is slow/abnormal or not, and transmit the data flow limit to the bus cluster 1220.

The bus cluster 1220 is further configured to control the data flow of the computer server in the bus cluster in the second cycle according to the data flow limit.

In an example embodiment, the management daemon 1240 is configured to adjust upper data flow limit of the computer server in the bus cluster 1220 in the second cycle according to the determining result.

Further, in an example embodiment, the management daemon 1240 is configured to adjust capacity of the callee cluster according to the determining result and determine upper data flow limit of the computer server in the bus cluster 1220 in the second cycle according to the capacity after adjustment.

Further, the management daemon 1240 is configured to reduce corresponding capacity of the callee cluster in case that the callee cluster is slow/abnormal; increase corresponding capacity of the callee cluster in case the callee cluster is not slow/abnormal.

Further, in an example embodiment, the management daemon 1240 is configured to reduce corresponding capacity of the callee cluster by the default percentage of initial value of capacity and increase corresponding capacity of the callee cluster by the default percentage of initial value of capacity.

In an example embodiment, the management daemon 1240 is configured to take the maximum between the two values below as the upper data flow limit of the computer server in the bus cluster 1220 in the second cycle: (1) product of the capacity after adjustment and rate of the computer server data flow in the first cycle with the total data flow of the computer server; (2) rate of the capacity after adjustment with the amount of the computer servers.

The upper data flow limit of some the computer server in the bus cluster in the second cycle may be calculated by the management daemon 1240 according to formula below: Max(C*q/Q, C/n), in which Max represents maximum between the two values, C represents the capacity corresponding to the bus cluster after adjustment, q is data flow of the computer server in the first cycle, Q is the total data flow amount of all the computer servers in the bus cluster in the first cycle, and n is amount of the computer server in the bus cluster.

In an example embodiment, the management daemon 1240 is configured to transmit the upper data flow limit to the bus cluster 1220, after upper data flow limit of the computer server in the bus cluster 1220 in the second cycle is obtained, and then the computer server in the bus cluster 1220 will be able to control its data flow within the upper data flow limit.

In an example embodiment, the bus cluster 1220 is further configured to get total the computer server data flow of the bus cluster 1220 in the second cycle; and in case that the total the computer server data flow exceeds preset multiple of capacity of the callee cluster, send a warning to the management daemon 1240.

In an example embodiment, the health condition data includes average time consumption, distribution data of time consumption and overtime rate of the callee cluster. the management daemon is configured to determine if the callee cluster in the first cycle may meet any condition or any combination of two or more conditions below; in case that the result is yes, it is determined that the callee cluster is slow: (1) average time consumption of the callee cluster reaches first threshold value; (2) in the time consumption distribution data of the callee cluster, the request ratio in each time consumption interval is not in default range; (3) overtime rate of the callee cluster reaches second threshold value.

In the example embodiment or another example embodiment, the health condition data further includes success rate and error rate; the management daemon 1240 is configured to determine if the callee cluster in the first cycle may meet any condition or combination of the two conditions below; (1) success rate of the callee cluster is lower than third threshold value; (2) error rate of the callee cluster reaches forth threshold value, in case that the result is yes, it is determined that the callee cluster is abnormal.

In an example embodiment, the management daemon 1240 is configured to receive the callee cluster input by administrator as a pressure test target and instruction for simulated pressure test on the pressure test target; and transmit short cycle reporting instruction to the bus cluster 1220.

The bus cluster 1220 is further configured to report health condition data to the management daemon 1240 by short cycle; the management daemon 1240 is further configured to transmit data flow limit data to the bus cluster 1220, according to the health condition data reported by the bus cluster 1220 by short cycle.

The bus cluster 1220 is further configured to control the computer server data flow in the bus cluster by the short cycle according to the data flow limit data in short cycle; and decrease the request amounts of all callee clusters except for the pressure test target by first default value in each short cycle.

Further, in an example embodiment, the management daemon 1240 is configured to stop simulated pressure text and transmit normal cycle reporting instruction and data flow limit data before simulated pressure test to the bus cluster 1220, in case that it meets any condition or combination of the two conditions below: (1) request amount of all callee clusters except for the pressure test target decreases to second default value; (2) the pressure test target is slow or abnormal.

A person of skill in the art may get aware that the whole or part of method in example embodiments above may be implemented through relevant hardware under instruction of computer server program. In example embodiments of the present disclosure, the program may be stored in a computer server-readable memory medium and executed by at least one processor in the computer server system, in order to realize the data flow of all methods containing in the example embodiments above. Wherein, the memory medium above may be diskette, optical disk, Read-Only Memory (ROM) or Random Access Memory (RAM), or the like.

All disclosures above are just some preferred example embodiments of the present disclosure, which are descried specifically and particularly, but not intending to limit the range of the present disclosure. It should be noticed that person of skill in the art may get various changes and modifications within the scope of the present disclosure, therefore, the protection scope of the present disclosure is defined by the claims.

The invention claimed is:

1. A management server for providing distributed flow control to a computer server system that provides online services to users, the computer server system comprising a bus cluster, a caller system, and a plurality of callee clusters, the management server comprising:
 a memory storing a set of instructions; and
 a processor in communication with the memory, wherein, when executing the set of instructions, the processor is programmed to:
  receive, from the bus cluster, health condition data of a callee cluster of the plurality of callee clusters in a first operation cycle of the computer server system;
  determine, based on the health condition data, whether the callee cluster is slow or abnormal in the first operation cycle according to time consumption data of the callee cluster;
  in response to determining whether the callee cluster is slow or abnormal in the first operation cycle, adjust a data flow limit in the bus cluster in a second operation cycle of the computer server system, wherein the second operation cycle is after the first operation cycle;
  direct, according to the adjusted data flow limit, the bus cluster to control the data flow of a computer server in the bus cluster in the second operation cycle;
  wherein the data flow limit is an upper data flow limit for a computer server in the bus cluster in the second operation cycle;
  wherein, when the processor is programmed to adjust the data flow limit, the processor is programmed to:

in response to determining whether the callee cluster is slow or abnormal in the first operation cycle, adjust a capacity of a computer server in the callee cluster, and determine the upper data flow limit for the computer server in the bus cluster in the second operation cycle according to the adjusted capacity;

wherein, when the processor is programmed to determine the upper data flow limit for the computer server in the bus cluster, the processor is programmed to:

determine a first value being a product of the adjusted capacity multiplied by a fraction of a data flow of the computer server in the bus cluster in the first operation cycle divided by a total data flow of all the computer servers in the bus cluster in the first operation cycle, determine a second value being a fraction of the adjusted capacity divided by a total number of the computer servers in the bus cluster, and take a larger value between the first value and the second value as the upper data flow limit for the computer server in the bus cluster in the second operation cycle; and wherein the processor is further programmed to receive from an administrator an instruction to conduct a pressure test targeting a callee cluster as a pressure test target, and in response to receiving the instruction to conduct the pressure test, the processor is programmed to:

send a short cycle reporting instruction to the bus cluster to report the health condition data according to a short cycle, wherein the short cycle has a shorter time period than the first operation cycle, receive the health condition data reported by the bus cluster according to the short cycle, control the data flow in the bus cluster according to the short cycle, and reduce an upper limits of request amount of the plurality of callee clusters except for the pressure test target by a first default value in each short cycle.

2. The management server of claim 1, wherein to adjust the capacity of the callee cluster, the processor is further programmed to:

reduce the capacity of the callee cluster when the callee cluster is slow or operates abnormally; and increase the capacity of the callee cluster when the callee cluster is not slow or operates normally.

3. The management server of claim 2, wherein to reduce the capacity the processor is further programmed to reduce the capacity by a default percentage of an initial value of the capacity; and to increase the capacity the processor is further programmed to increase the capacity by the default percentage of the initial value of the capacity.

4. The management server of claim 1, wherein to direct the bus cluster to control the data flow of the computer servers in the bus cluster in the second operation cycle the processor is further programmed to:

obtain a total data flow of the computer servers in the bus cluster in the second operation cycle; and when the total data flow exceeds a preset times of the adjusted capacity of the callee cluster, send an alert to an administrator of the management server.

5. The management server of claim 1, wherein the health condition data comprises at least one of an average time consumption of the callee cluster spending on requests in a reporting cycle, distribution data of time consumptions of the callee cluster spending on requests in the reporting cycle, and an overtime rate of the time consumptions of the callee cluster; and to determine whether the callee cluster is slow or abnormal in the first operation cycle the processor is further programmed to determine that the callee cluster is slow when the callee cluster in the first operation cycle meets at least one condition of:

the average time consumption of the callee cluster reaches a first threshold value;

among the time consumption distribution data of the callee cluster, a request ratio in each time consumption interval is not in a default range;

the overtime rate of the callee cluster reaches a second threshold value.

6. The management server of claim 1, wherein the health condition data comprises a success rate and an error rate; and to determine whether callee cluster is slow or abnormal the processor is further programmed to determine that the callee cluster is abnormal when the callee cluster in the first operation cycle meets at least one condition of:

the success rate of the callee cluster is lower than a third threshold value;

the error rate of the callee cluster reaches a forth threshold value.

7. The management server of claim 1, wherein:

when the pressure test meets at least one condition that: a request amount of all callee clusters except for the pressure test target decreases to a second default value or the pressure test target is slow or abnormal, the processor is further programmed to:

stop the pressure test;

recover a data flow limit data before the pressure test; and send a normal cycle reporting instruction to the bus cluster.

8. A method for providing distributed flow control to a computer server system, comprising:

providing the computer server system configured to provide online services to users, wherein the computer server system comprises a bus cluster including a plurality of computer servers, a caller system including a plurality of computer servers, a plurality of callee clusters including a plurality of computer servers, and a management daemon server;

receiving, by the management daemon server from the bus cluster, health condition data of a callee cluster of the plurality of callee clusters in a first operation cycle of the computer server system;

determining, by the management daemon server, whether the callee cluster is slow or abnormal based on the health condition data in the first operation cycle according to time consumption data of the callee cluster;

adjusting, by the management daemon server, a data flow limit of the bus cluster in a second operation cycle of the computer server system after the first operation cycle according to whether the callee cluster is slow or abnormal in the first operation cycle;

directing, by the management daemon server, the bus cluster to control the data flow of the computer servers in the bus cluster in the second operation cycle according to the adjusted data flow limit;

wherein the data flow limit is an upper data flow limit for a computer server in the bus cluster in the second operation cycle;

wherein the adjusting of the data flow limit comprises:
adjusting a capacity of the callee cluster according to whether the callee cluster is slow or abnormal in the first operation cycle, and
determining the upper data flow limit for the computer server in the bus cluster in the second operation cycle according to the adjusted capacity; and
wherein the determining of the upper data flow limit for the computer server in the bus cluster comprises:
determining a first value being a product of the adjusted capacity multiplied by a fraction of a data flow of the computer server in the bus cluster in the first operation cycle divided by a total data flow of all the computer servers in the bus cluster in the first operation cycle,
determining a second value being a fraction of the adjusted capacity divided by a total number of the computer servers in the bus cluster, and
taking a larger value between the first value and the second value as the upper data flow limit for the computer server in the bus cluster in the second operation cycle;
receiving, by the management daemon server from an administrator, an instruction to conduct a pressure test targeting a callee cluster as a pressure test target; and
In response to receiving the instruction to conduct the pressure test:
sending, by the management daemon server, a short cycle reporting instruction to the bus cluster to report the health condition data according to a short cycle, wherein the short cycle has a shorter time period than the first operation cycle,
receiving, by the management daemon server, the health condition data reported by the bus cluster according to the short cycle,
controlling, by the management daemon server, the data flow in the bus cluster according to the short cycle, and
reducing, by the management daemon server, an upper limits of request amount of the plurality of callee clusters except for the pressure test target by a first default value in each short cycle.

9. The method of claim 8, wherein the adjusting of the capacity of the callee cluster comprises:
reducing the capacity of the callee cluster when the callee cluster is slow or operates abnormally; and
increasing the capacity of the callee cluster when the callee cluster is not slow or operates normally.

10. The method of claim 9, wherein the reducing of the capacity comprises reducing the capacity by a default percentage of an initial value of the capacity; and
the increasing of the capacity comprise increasing the capacity by the default percentage of the initial value of the capacity.

11. The method of claim 8, wherein the directing of the bus cluster to control the data flow of the computer servers in the bus cluster in the second operation cycle comprises:
obtaining a total data flow of the computer servers in the bus cluster in the second operation cycle; and
when the total data flow exceeds a preset times of the adjusted capacity of the callee cluster, sending an alert to an administrator of the management daemon server.

12. The method of claim 8, wherein the health condition data comprises at least one of an average time consumption of the callee cluster spending on requests in a reporting cycle, distribution data of time consumptions of the callee cluster spending on requests in the reporting cycle, and an overtime rate of the time consumptions of the callee cluster; and
the determining of whether the callee cluster is slow or abnormal in the first operation cycle comprises
determining that the callee cluster is slow when the callee cluster in the first operation cycle meets at least one condition of:
the average time consumption of the callee cluster reaches a first threshold value;
among the time consumption distribution data of the callee cluster, a request ratio in each time consumption interval is not in a default range;
the overtime rate of the callee cluster reaches a second threshold value.

13. The method of claim 8, wherein the health condition data comprises a success rate and an error rate; and
the step of determining whether callee cluster is slow/abnormal comprises determining that the callee cluster is abnormal when the callee cluster in the first operation cycle meets at least one condition of:
the success rate of the callee cluster is lower than a third threshold value;
the error rate of the callee cluster reaches a forth threshold value.

14. The method of claim 8, further comprising:
when the pressure test meets at least one condition of: a request amount of all callee clusters except for the pressure test target decreases to a second default value, or the pressure test target is slow or abnormal:
stopping, by the management daemon server, the pressure test,
recovering, by the management daemon server, a data flow limit data before the pressure test, and
sending, by the management daemon server, a normal cycle reporting instruction to the bus cluster.

* * * * *